United States Patent [19]

Ripberger et al.

[11] Patent Number: 4,704,950
[45] Date of Patent: Nov. 10, 1987

[54] PLUNGER PISTON FOR INTERNAL COMBUSTION ENGINES

[75] Inventors: Emil Ripberger, Remseck; Gotthard Stuska, Fellbach; Reiner Ulrich, Weissach, all of Fed. Rep. of Germany

[73] Assignee: Mahle GmbH, Fed. Rep. of Germany

[21] Appl. No.: 15,317

[22] Filed: Feb. 17, 1987

Related U.S. Application Data

[63] Continuation-in-part of Ser. No. 760,117, Jul. 29, 1985, abandoned.

[30] Foreign Application Priority Data

Aug. 17, 1984 [DE] Fed. Rep. of Germany ....... 3430258

[51] Int. Cl.$^4$ .............................................. F16J 1/04
[52] U.S. Cl. ....................... 92/208; 92/229; 123/193 P
[58] Field of Search ................... 92/225, 226, 228–230, 92/208; 123/193 P, 193 R

[56] References Cited

U.S. PATENT DOCUMENTS 3,917,133  11/1975  Sakakibara ..................... 123/193 P
4,162,661   7/1979  Nakanishi et al. ............. 123/193 P
4,246,833   1/1981  Burklund ........................... 92/172
4,498,219   2/1985  Ban et al. ...................... 123/193 P

FOREIGN PATENT DOCUMENTS 2545589  4/1977  Fed. Rep. of Germany ... 123/193 P
2733269  1/1978  Fed. Rep. of Germany ........ 92/229
3039382  4/1982  Fed. Rep. of Germany ... 123/193 P
2534343  4/1984  France ............................ 123/193 P
 393076  6/1933  United Kingdom .................. 92/228

Primary Examiner—Craig R. Feinberg
Attorney, Agent, or Firm—James C. Wray

[57] ABSTRACT

An extremely light and low friction plunger piston for internal combustion engines, particularly Otto-type engines for private cars. The piston has the following ratios and dimensions $$(H/D)=0.20-0.35$$

$$(T/D)=0.22-0.38$$

$$(A/D)=0.15-0.25$$

$$(B/D)=(A/D)$$

wherein
 D=piston diameter
 H=compression height between a top of the head and the gudgeon pin bore axis
 T=distance from the radially outer boss faces to the piston axis
 A=axial skirt dimension below annular groove nearest the pin bore axis at a peripheral zone of the skirt extending over an angle α of 15 to 60 degrees to either side of a connecting rod oscillating plane
 B=axial skirt dimension below said annular groove in a direction along said gudgeon pin axis;

and further wherein the distal end of the skirt is reduced radially over an axial dimension of 10–25% of an axial length of the skirt in said direction along said gudgeon pin axis, said distal end being reduced at its edge by 0.01–0.15 mm.

4 Claims, 9 Drawing Figures

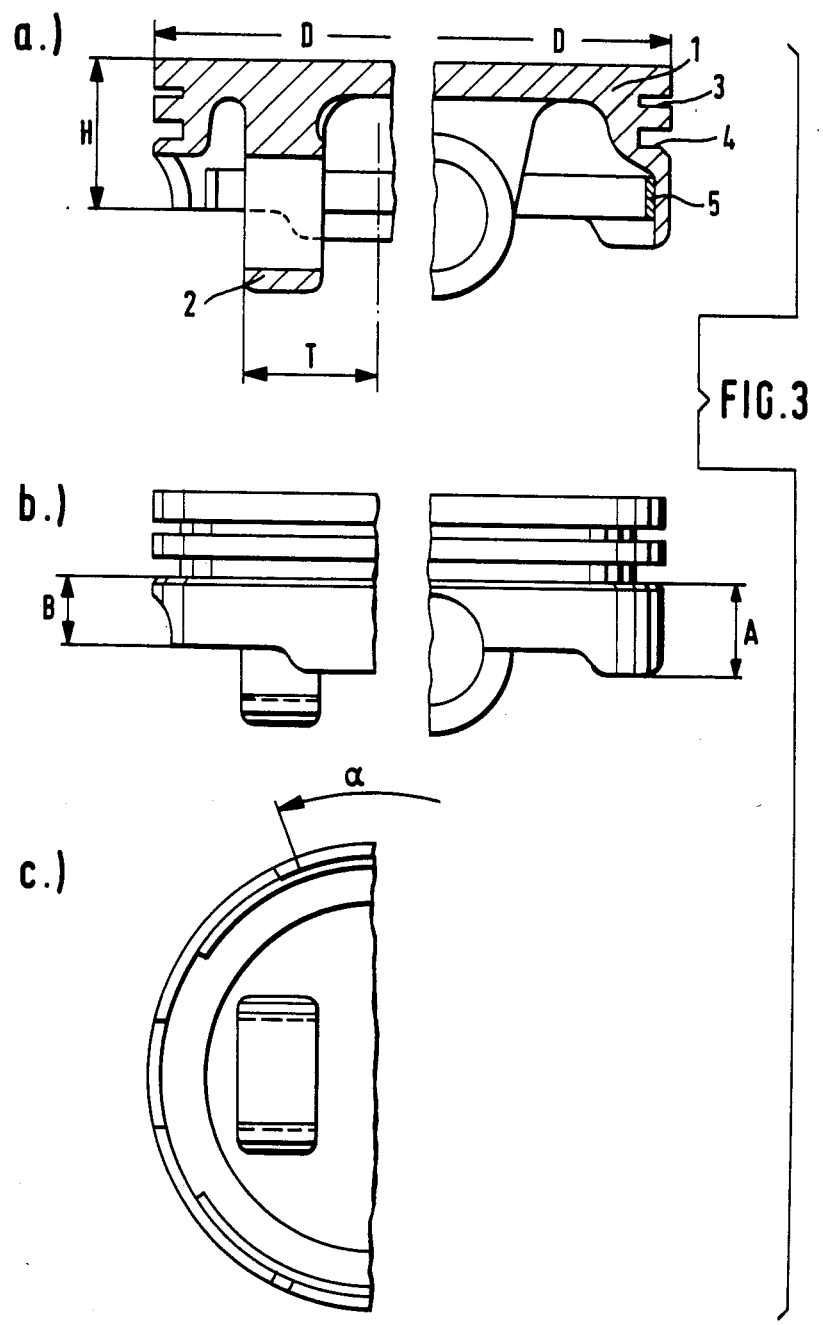

PLUNGER PISTON FOR INTERNAL COMBUSTION ENGINES

This application is a continuation-in-part of application Ser. No. 760,117 filed July 29 1985 which is now abandoned.

BACKGROUND TO THE INVENTION

The invention relates to a plunger piston for internal combustion engines, more particularly Ottotype engines for private cars, in which the gudgeon pin bosses are mounted perpendicularly on the piston crown free from an annular strip starting from the piston crown and merging into the piston stem.

OBJECT OF THE INVENTION

An object of the invention is to provide a piston which is low in friction when used in an engine and which is extremely light by virtue of its design.

SUMMARY OF THE INVENTION

According to the invention there is provided a plunger piston for internal combustion engines, having a cylindrical piston head with an annular ring zone having annular grooves therein for receiving piston rings, a cylindrical piston skirt, and gudgeon pin bosses with coaxial gudgeon pin bores therein, said bosses extending perpendicularly from the piston head into a space within the piston skirt and having radially outer boss faces, the improvement comprising selecting the following ratios and dimensions $(H/D) = 0.20 - 0.35$ $(T/D) = 0.22 - 0.38$ $(A/D) = 0.15 - 0.25$ $(B/D) \leq (A/D)$ wherein
- D = piston diameter
- H = compression height between a top of the head and the gudgeon pin bore axis
- T = distance from the radially outer boss faces to the piston axis
- A = axial skirt dimension below annular groove nearest the pin bore axis at a peripheral zone of the skirt extending over an angle α of 15 to 60 degrees to either side of a connecting rod oscillating plane
- B = axial skirt dimension below said annular groove in a direction along said gudgeon pin axis;

and further wherein the distal end of the skirt is reduced radially over an axial dimension of 10-25% of an axial length of the skirt in said direction along said gudgeon pin axis, said distal end being reduced at its edge by 0.01–0.15 mm.

Previous solutions to the problem according to the invention lay in achieving the light weight and the low friction in engine operation by providing the most widely diverse recesses in the piston skirt. However, all in all, every one of the prior art solutions chose a height of piston stem which was quite considerably above that claimed in accordance with the invention. At least in the region of the connecting rod oscillating plane, the shortest known piston skirts still have heights which are so great that they extend into the region of the bottommost edge of the gudgeon pin boss, in the direction of the piston axis. It was not hitherto deemed possible to be able adequately to guarantee necessary guidance of the piston within the cylinder with shorter lengths of stem. However, contrary to expectations, it is possible with the short stem constructed according to the invention to fulfil entirely satisfactorily all the demands imposed on a piston for internal combustion engines.

BRIEF DESCRIPTION OF DRAWINGS

Examples of embodiments of the invention are illustrated in the accompanying drawings, in which:

FIG. 3 shows a piston with a stripe in the stem, viewed in the same way as in FIG. 1.

DESCRIPTION OF PREFERRED EMBODIMENT

Figure 1:
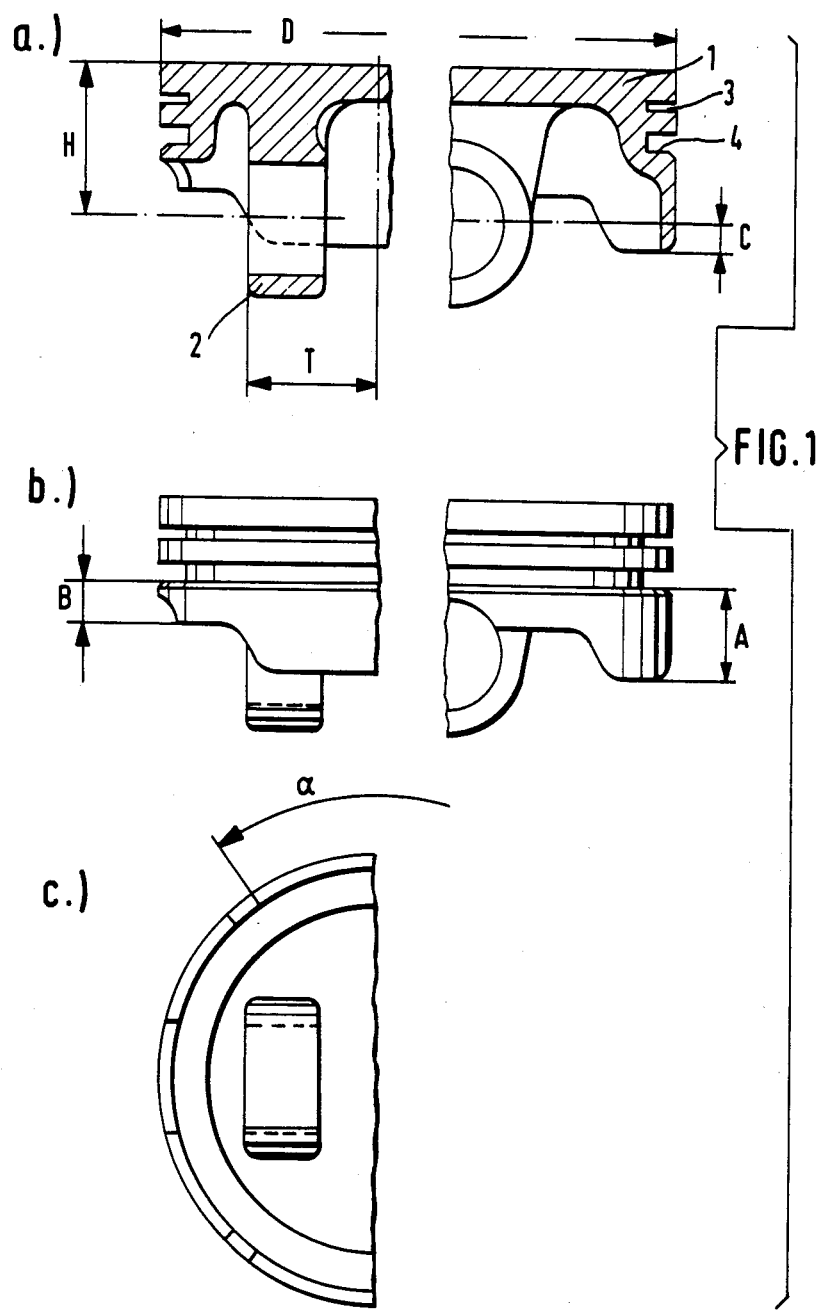
FIG. 1a shows a piston partly in section along the gudgeon pin axis, partly in a cross-section at a right angle thereto.
FIG. 1b is a view of the piston partly in the direction of the gudgeon pin axis and partly in a direction at a right angle thereto.
FIG. 1c is a view of the piston from below.

The piston 1 is made from an aluminum-silicon alloy and has a diameter of 78 mm. The gudgeon pin bosses 2 are integrally formed and extend from the piston head. The distance T from the radially outer surface of the gudgeon pin boss 2 to the piston axis is 23 mm. The bosses have coaxial bores having an inside diameter of 18 mm. An upper piston ring groove 3 serves to accommodate a compression ring while an oil scraper ring is located into a bottom piston ring groove 4. The piston has a compression height H of 25 mm. On a periphery of in each case $\alpha = 30$ degrees to either side of the connecting rod oscillating plane, the dimension A of the piston skirt A measures 16 mm. In the adjacent peripheral zone, in each case adjacent the ends of the gudgeon pin, the skirt dimension B in the embodiment shown in FIG. 1 diminishes to 7 mm. The distal end skirt having an axial dimension C of 3 mm is reduced radially over an axial dimension of 10–25% of the axial length of the skirt, said distal end being reduced at its edge by 0.01–0.15 mm.

Figure 2:
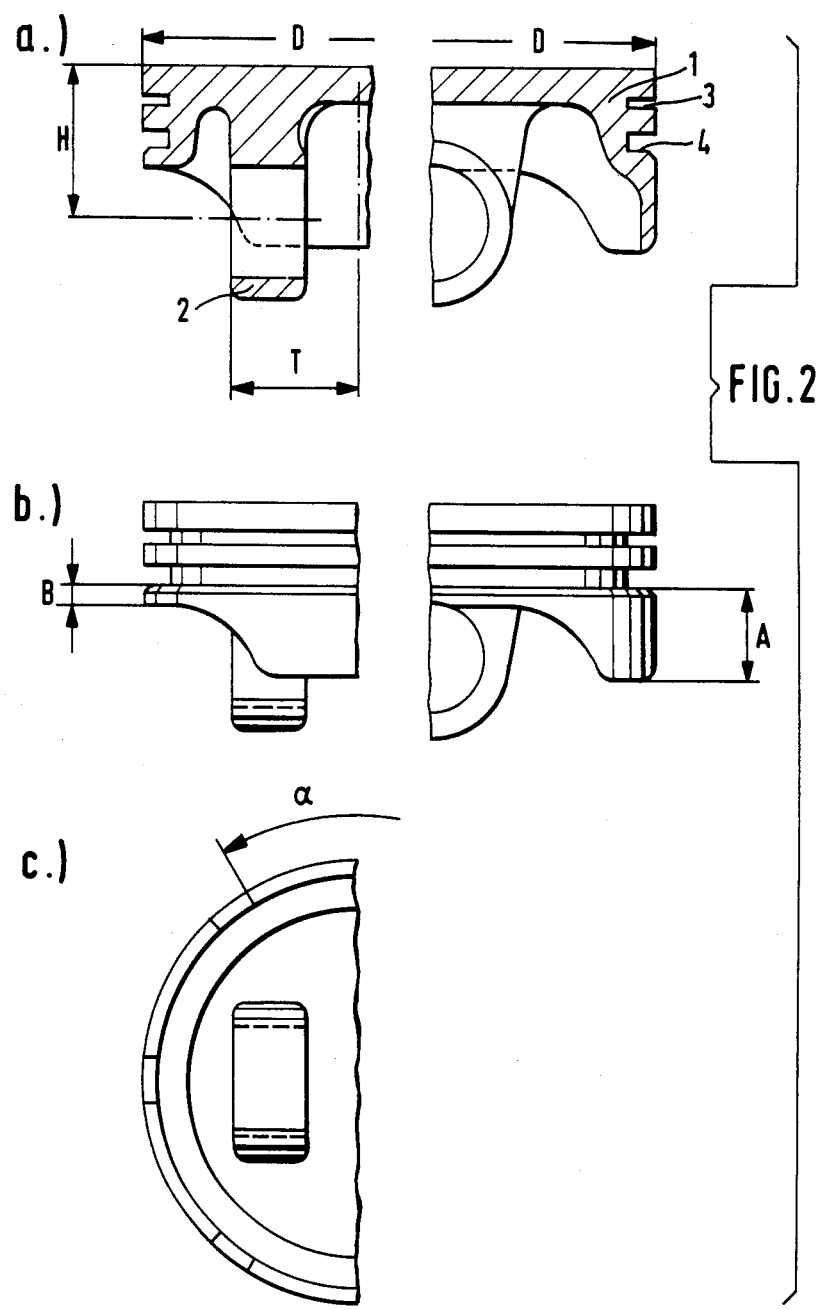
FIG. 2 shows a different type of piston viewed in the same way as in FIG. 1.

The piston shown in FIG. 2 differs from that in FIG. 1 only in that the skirt height B is still further reduced, in fact to a dimension of 3 mm.

In the case of the embodiment shown in FIG. 3, a expansion control strip 5 of the sheet steel is provided in the piston stem. This control strip extends circumferentially in each case substantially over the entire periphery of the inner surface of the skirt between the semicircular skirt recesses which are provided to allow the gudgeon pin to be passed through the skirt. Only at its ends is the control strip anchored in the skirt material.

We claim:

1. In a plunger piston for internal combustion engines, having a cylindrical piston head with an annular ring zone having annular grooves therein for receiving piston rings, a cylindrical piston skirt having a distal end, and gudgeon pin bosses with coaxial gudgeon pin bores therein for containment of a coacting gudgeon pin, said bosses extending perpendicularly from the piston head into a space within the piston skirt and having radially outer boss faces, the improvement comprising selecting the following ratios and dimensions $(H/D) = 0.20 - 0.35$ $(T/D) = 0.22-0.38$ $(A/D) = 0.15-0.25$ $(B/D) \leq (A/D)$ wherein D = piston diameter
- H = compression height between a top of the head and the gudgeon pin bore axis
- T = distance from the radially outer boss faces to the piston axis
- A = axial skirt dimension below annular groove nearest the pin bore axis at a peripheral zone of the skirt extending over an angle α of 15 to 60 degrees to either side of a connecting rod oscillating plane
- B = axial skirt dimension below said annular groove in a direction along said gudgeon pin axis;

and further wherein the distal end of the skirt is reduced radially over an axial dimension of 10-25% of an axial length of the skirt in said direction along said gudgeon pin axis, said distal end being reduced at its edge by 0.01-0.15 mm.

2. A plunger piston according to claim 1, wherein $(B/D) = 0.03-0.1.$

3. A plunger piston according to claim 1, wherein only two annular grooves are provided, one for a compression ring and the other for an oil scraper ring.

4. A plunger piston according to claim 1, including expansion control strips consisting of a material having a higher flexural strength and a lower expansion coefficient than that of material forming said skirt, said strips being molded into the skirt and extending circumferentially in each case substantially over an entire periphery of an inner surface of the skirt between skirt recesses formed below said annular groove in said direction along said gudgeon pin axis permitting entry of said gudgeon pin.

* * * * *